United States Patent [19]

Neukom

[11] 4,077,478

[45] Mar. 7, 1978

[54] DOWN PRESSURE CONTROL MECHANISM FOR GRAIN DRILLS

[75] Inventor: Chester G. Neukom, Jamestown, N. Dak.

[73] Assignee: Haybuster Manufacturing, Inc., Jamestown, N. Dak.

[21] Appl. No.: 770,459

[22] Filed: Feb. 22, 1977

[51] Int. Cl.² .................. A01B 61/00; A01C 5/00
[52] U.S. Cl. ................... 172/267; 111/59; 111/85; 172/414; 172/500; 172/502; 172/572
[58] Field of Search .................. 111/59-63, 111/66, 67, 69, 73, 78, 80, 81, 85-88; 172/142, 414, 261-271, 497-502, 570-573, 643, 705-711

[56] References Cited

U.S. PATENT DOCUMENTS

| | | | |
|---|---|---|---|
| 520,843 | 6/1894 | Carpenter | 111/66 |
| 536,231 | 3/1895 | Pickett | 172/500 |
| 626,822 | 6/1899 | Baseman | 111/66 |
| 753,452 | 3/1904 | Van Brunt | 172/500 |
| 2,155,443 | 4/1939 | Parks et al. | 111/66 |
| 2,738,969 | 3/1956 | Morris et al. | 111/85 X |
| 3,005,426 | 10/1961 | Sorensen et al. | 111/62 |
| 3,228,363 | 1/1966 | Gardner et al. | 111/73 |
| 4,004,640 | 1/1977 | Bland | 172/705 |
| 4,030,428 | 6/1977 | Traux | 111/85 |

Primary Examiner—Ernest T. Wright, Jr.
Assistant Examiner—James R. Feyrer
Attorney, Agent, or Firm—Dugger, Johnson & Westman

[57] ABSTRACT

A down pressure control for use with furrow openers in grain drills which provides a spring load for maintaining down pressure on the furrow opener during normal operating conditions and which can be at relatively high rate to permit minimum tillage, or work in hard ground, but yet will release upon excessive movement of the furrow opener to prevent overstressing the hold down springs. The down pressure control is used in combination with an individual depth control for each of the furrow openers to insure that each furrow opener is individually controlled as to down pressure and depth.

15 Claims, 3 Drawing Figures

4,077,478

DOWN PRESSURE CONTROL MECHANISM FOR GRAIN DRILLS

BACKGROUND OF THE INVENTION

1. Field of the Invention

The present invention relates to down pressure controls for grain drill furrow openers.

2. Prior Art

In the prior art, most grain drills had down pressure for the furrow openers controlled by a compression spring that was mounted on a telescoping rod and which would exert a down pressure increasing directly proportional to the spring movement. The depth of the openers generally was controlled proportional to the amount of down pressure on the individual furrow openers.

One of the problems in the down pressure controls was that in hard ground, for example where minimum tillage practices are being followed, by the time the springs had been compressed enough to exert a sufficient down pressure on the furrow openers, the springs were almost bottomed out, and then if the furrow openers struck a rock or other obstruction something would have to give and usually would break. Further, even if the depth control springs had some range of movement, the normal up and down movement of the furrow openers was sufficient to cause high spring load changes, which would overload and damage the individual parts.

General examples of down pressure controls utilizing spring force for keeping the furrow openers in the ground are shown in U.S. Pat. Nos. 2,155,443; 3,005,426; 3,228,363 and 2,738,969.

SUMMARY OF THE INVENTION

The present invention relates to a spring loaded down pressure control for furrow openers of a grain drill or the like which provides a substantially uniform down pressure across a normal range of movement of the furrow openers, even in hard ground, but when a furrow opener moves excessively because of striking an obstruction or the like, the spring control will permit such movement without excessively loading the spring. The spring load does remain effective to return the opener to working position when normal conditions are again encountered by the furrow opener. The maximum depth of each furrow opener is controlled by a separate, depth control press wheel.

In the form of the invention shown, a hydraulic cylinder operates a rock shaft which loads a spring for each furrow opener. The spring acts through a lever that is pivotally attached at one end to the furrow opener. The pivoting lever has a roller at its opposite end that moves along a track to exert a downward force on the furrow opener. The roller end of the lever has to roll as the lever moves against the spring force in order to permit the furrow opener to raise. When the furrow opener pivots through a normal range of operation the force from the spring increases as the furrow opener moves upwardly. The roller track includes a release portion along which the roller may move when the furrow opener moves a preselected amount upwardly. The release portion is made so that upward movement of the furrow opener does not increase the spring load substantially. The furrow opener is permitted to release or in other words to move a substantial distance without over-stressing the spring once the opener has moved beyond the range of normal upward working movement. The spring does increase load on the furrow opener during normal movement upwardly so that upward movement of the furrow opener because of ground hardness variations is resisted, but obstructions can be cleared without overload on the spring.

The amount of down pressure is controlled as shown through the use of a hydraulic cylinder that can be stopped at the desired position to regulate high downward loads. If soft ground spots are encountered in the ground once the furrow opener drops a certain amount, the spring load will start to drop off rather substantially as well to make sure that excessive down movement is not permitted.

The device is reliable in operation, and will easily operate in a wide variety of ground conditions.

DESCRIPTION OF THE PREFERRED EMBODIMENT

Figure 1:
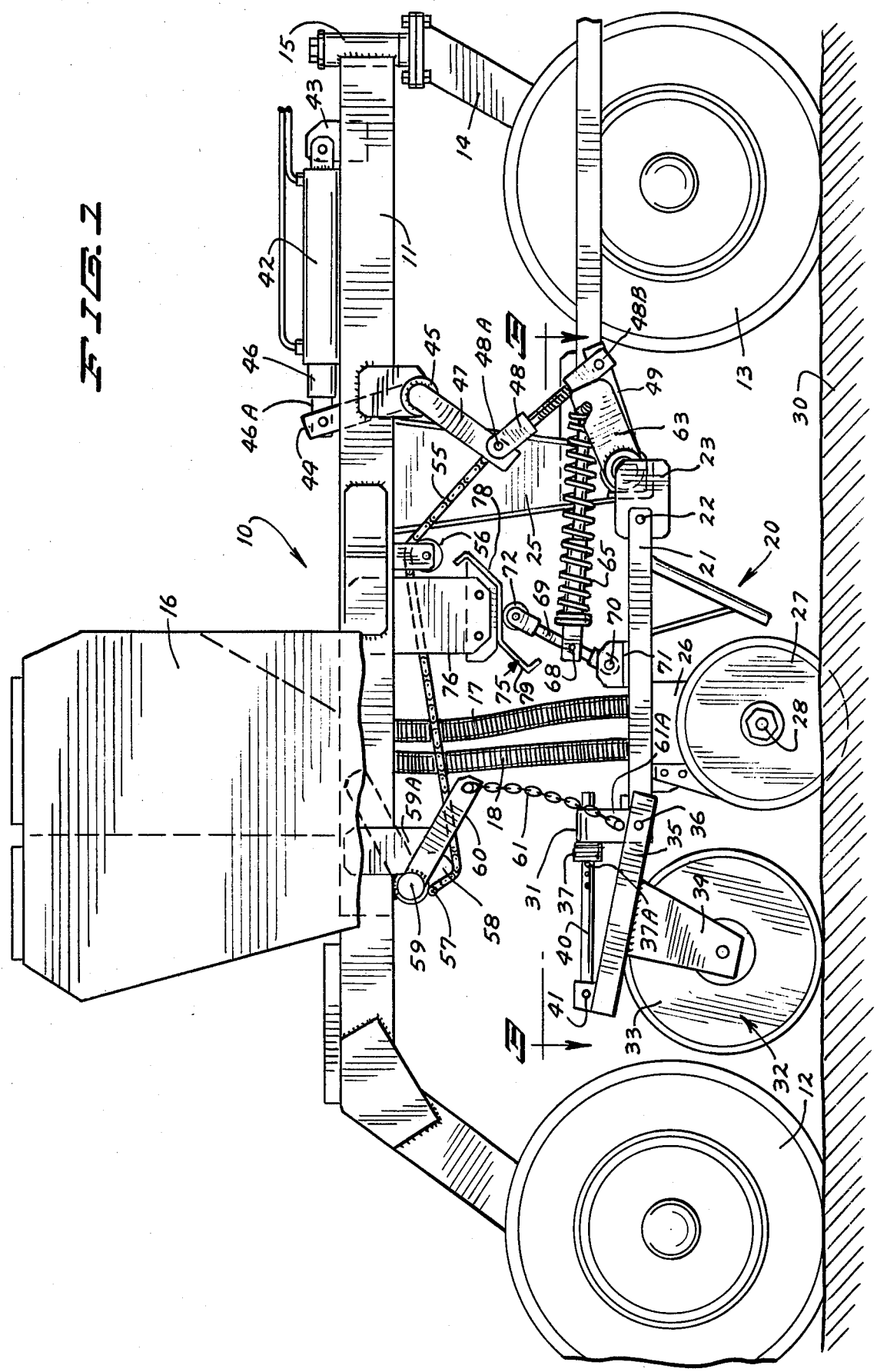
FIG. 1 is a part schematic side elevational view of a typical grain drill embodying the down pressure control for the furrow openers made according to the present invention.

A grain drill illustrated generally at 10 includes a main frame 11, which is supported at its rear portions by suitable wheels 12 (there would be at least two wheels spaced along the transverse width of the grain drill) and at the forward end the frame 11 is supported by a caster wheel assembly 13. The caster wheels are dual wheels which are mounted onto a support 14, that is pivotally mounted about a vertical axis in a housing 15 at the forward end of the frame 11.

The frame 11 supports a drill box 16 which has compartments for fertilizer and seed, and which fertilizer and seed are metered in a conventional manner through grain tubes 17 and fertilizer tubes 18 that lead down to furrow opener assemblies, each illustrated generally at 20.

Each furrow opener assembly (there are a plurality of them positioned side by side) comprises a fore and aft extending subframe 21 that is pivotally mounted as at 22 to suitable ears 23 that are spaced apart and mounted on a cross support 24. The cross support 24 extends transversely across the entire width of the drill, and cross support 24 is supported with respect to the upper or overhead frame 11 on suitable upright supports 25.

The upright supports 25 are fixed on the frame 11 in transverse position (there are two or more supports 25 transversely across the width of the machine) and support the cross support 24 in a suitable manner. The subframes 21, as shown, each include a pair of spaced straps 21A and 21B that are fastened to a pair of ears 23. Each subframe 21 extends rearwardly and supports a housing 26. The housings 26 in turn each have a pair of disc openers 27 rotatably mounted thereto on a suitable axis 28, and can be mounted in any desired manner. The disc openers are commonly used, are made so that they are closer together adjacent their forward sides, and as they roll, as the grain drill is moved along the ground in a forward direction, the discs will open a furrow in the ground 30, and seed and fertilizer from tubes 17 and 18 will be dropped into the open furrow in the ground 30.

Figure 2:
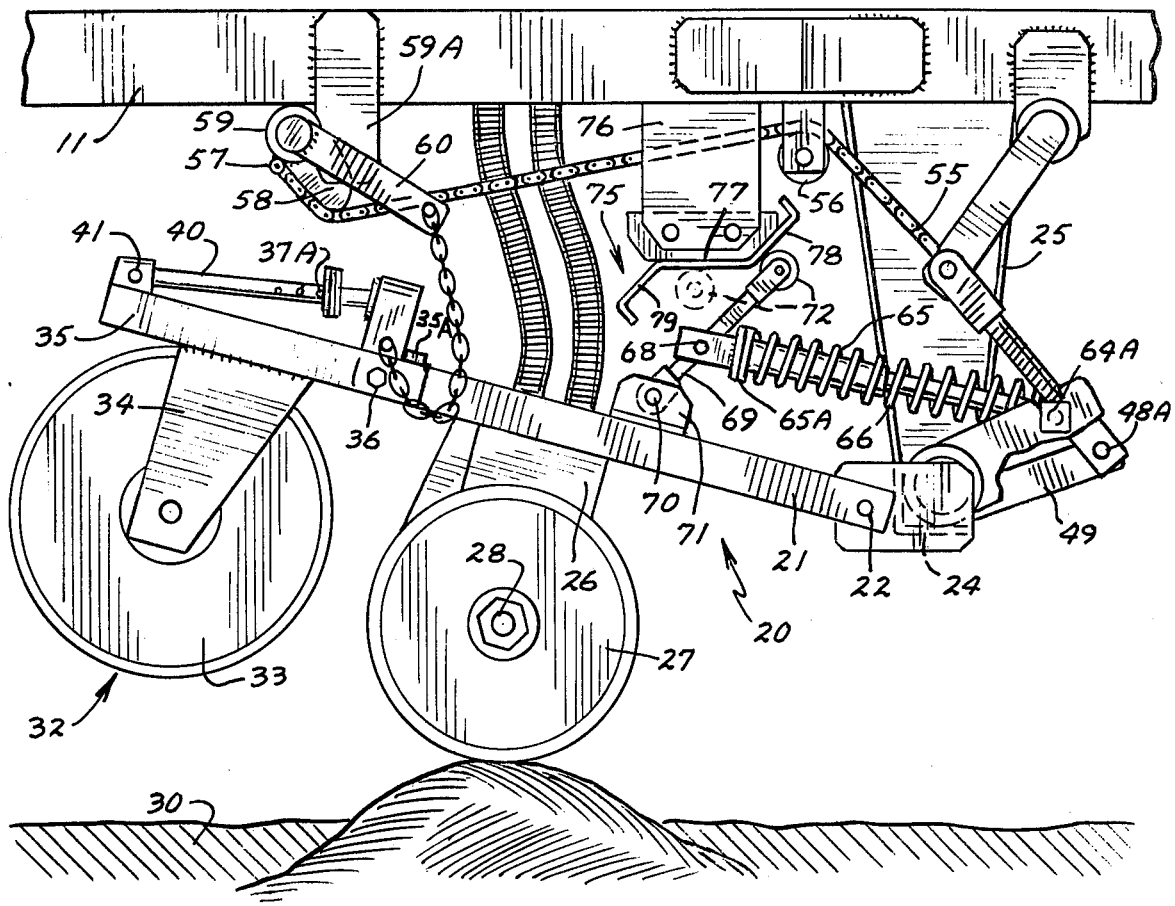
FIG. 2 is a side elevational view of a furrow opener showing the action of the furrow opener hold down device when the furrow opener goes over an obstruction.
Figure 3:
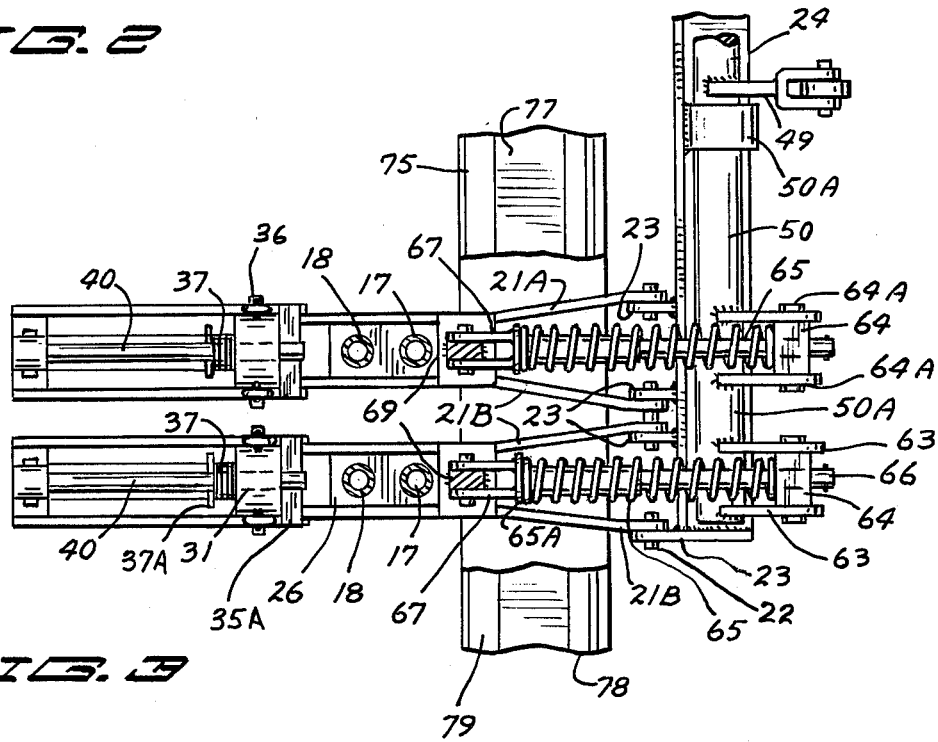
FIG. 3 is a fragmentary top plan view of the hold down device with parts in section and parts broken away.

A depth control-press wheel assembly 32 is mounted at the rear of each subframe 21. The depth control-press wheel assembly 32 includes a press wheel 33 that is rotatably mounted on supports 34 that in turn are attached to a top frame 35. The frame 35 is pivotally mounted to the frame 21 about a pivot axis 36, and may pivot up and down relative to the frame 21 between a stopped position in downward direction which prevents the wheel 33 from dropping downwardly too far (as shown in FIG. 2), and a stopped position in upward direction which is regulated by adjusting suitable spacers or washers 37 on rod or pipe 40 that slides relative to an inverted U shaped member 31. The member 31 is used to guide the pipe 40, and the washers or spacers 37 slip over the pipe. A cross pin 37A keeps the pipe from sliding through the member 31 beyond a desired position as the press wheel 33 tends to pivot upwardly. The washers 37 will abut against the rear edge of inverted member 31 to control the upward pivotal movement about the pivot 36 by the frame 35.

The rod or pipe 40 is suitably pivotally mounted as at 41 to the rear portions of the frame 35, and by regulating the number of washers 37, and also by changing the position of the pin 37A on the pipe 40, the stopped position of the press wheel 33 relative to the furrow opener can be adjusted. This will in turn control the depth of the furrow openers 27 as the drill is moved along. Downward spring force is exerted on the furrow opener to insure that the furrow opener enters the ground.

The depth control mechanism is shown in detail in copending U.S. patent application Ser. No. 749,051, filed Dec. 9, 1975 entitled Press Wheel Depth Control For Grain Drill Furrow Openers.

The downward pressure or force on the furrow openers is controlled through the use of a double acting hydraulic cylinder indicated generally at 42 mounted between a support 43 on the frame, and an arm 44 that controls the pivoting of a cross tube 45. The cross tube is rotatably mounted on the frame in the normal manner. The retraction of the rod, which in turn retracts the rod end 46A of the cylinder rod will be stopped in the desired position through the use of spacers 46 mounted on the rod to prevent the rod end 46A from moving back toward the cylinder body more than a desired amount.

The cross tube 45 has levers or actuating arms 47 thereon. The arm 47 shown in turn has an adjustable link 48 pivotally connected at one end thereof as shown in 48A, and the other end of the link 48 is pivotally connected as at 48B to a control arm 49. The control arm 49 in turn is mounted to drive a spring control tube 50. The tube 50 is rotatably mounted in suitable sleeves 50A relative to the cross member 24. The sleeves 50A may be welded at the desired spacings along cross member 24.

The arm 47 has a flexible chain 55 (or a cable) connected thereto, and this chain 55 passes over a suitable guide 56 that is mounted on the frame 11, and in turn is attached as at 57 to a pivot control member 58 mounted on a cross tube 59 underneath the grain and fertilizer box 16. This cross tube 59 is rotatably mounted in sleeves or bushings attached to suitable supports 59A attached to the frame 11. The cross tube has a plurality of arms 60 attached thereto, one for each furrow opener assembly. Each of the arms 60 is used for lifting the respective furrow opener assembly and subframe 21 out of the ground by using a chain 61 connected between the outer end of the respective arm 60 and connected as at 61A to the member 31 of each subframe 21.

It can be seen that when the rod end 46A of the cylinder 42 is extended, the arm 44 will rotate counterclockwise, also pivoting the tube 45 counterclockwise. This will cause the arm 47 to rotate counterclockwise pushing downwardly on the link 48 and pivoting the cross tube 50 through arm 49. The tube 50 has a separate pair of down pressure spring control arms 63, 63 fixed to the tube 50 in alignment with each of the furrow opener assemblies. The arms 63 are welded to tube 50 and rotate with the tube. Each pair of arms 63 pivotally mounts a cross block 64 that has ears or studs 64A that are rotatably mounted in slots in the arms 63. For each furrow opener assembly a compression spring 65 is mounted over a telescoping rod 66, and as can be seen one end of the rod 66 passes through an opening in the associated block 64. The other end of the rod 66 has a bifurcated or fork type connecting member 67 that is pivotally mounted as at 68 to a lever arm 69. The lever arm 69 in turn has one end pivotally mounted as at 70 between a pair of ears 71, which ears are mounted on the associated furrow opener frame 21.

The lever 69 is a spring control lever, and as can be seen the opposite end of the lever has a roller 72 mounted thereon. A roller track 75 is mounted onto suitable supports 76 which in turn are supported with respect to the frame 11. The roller track is a formed member that extends across the width of the drill, and provides a running surface for the rollers 72 for each one of the levers 69. It should be noted that there is a separate lever 69, spring 65, and a pair of ears 63 for controlling the spring for each of the furrow opener assemblies used in the grain drill assembly.

The roller track 75 has a center section 77, that is generally horizontal. The track section 77 thus defines a surface that is generally perpendicular to the vertical direction (the direction of depth control) and is parallel to the axis of pivot 22, about which the surframe 21 moves.

The track section 77 is of short fore and aft length, that is, it is short in direction perpendicular to the axis 22, and this horizontal section 77 joins a upwardly inclined or obliquely positioned track section 78 at the forward edge. Track section 78, presents a track surface for the roller 72 that is upwardly oblique to the vertical direction, which is the direction in which the down pressure is to be controlled. At the rear of the track section 77, there is downwardly oblique third track section 79 which provides a stop limit for downward movement, and also a limit to rearward movement of the roller 72 and the arm or lever 69.

Extension of the rod end 46A of the cylinder 42, which provides a lifting action for the furrow opener assemblies, also releases the pressure on the springs 65. Clockwise movement of the arms 49 because of compression loading of the link 48 will cause the tube 50 to rotate clockwise, and also then the arms 63 to rotate clockwise. This will move the blocks 64 away from the levers 69, and the levers will be permitted to pivot about pivot 70 so that the rollers 72 move forwardly toward the track section 78. At the same time, the arm 47 will pull on chain 55, which in turn will pull through its connection 57 and 58 and tend to rotate the tube 59 causing the arm 60 to rotate in counterclockwise direction, lifting the chains 61, and lifting the frames 21 about pivots 22. Thus the springs are released, and the frame is lifted to raise the unit out of the ground by the same cylinder.

For working, however, the rod of the cylinder assembly 42 is retracted until stop 46 stops movement. This causes the tube 50 to move to the position shown in FIGS. 1 and 2. The arm 47 pulls on link 48, which in turn causes lever 49 to rotate in counterclockwise direction and the arms 63 also rotate in counterclockwise direction. The arms 63 will then load the springs 65 through blocks 64. The rods 66 will slide through blocks 64 causing the springs 65 to be compressed. The springs 65 bear against the collars 65A and in turn urge the bifurcated ends 67 through the pivot connections 68 to pivot the levers 69 counterclockwise about their pivots 71. This will force the rollers 72 under the roller guide track, and specifically under the track section 77 as shown in FIG. 1.

The chain link 55 will be loosened as will the chain 61, and thus there is no lifting force on the frames 21. The respective frames 21 will tend to pivot downwardly under the force of the lever 69 riding under the track portion 77. It can be seen that the more the lever 69 tends to pivot in counterclockwise direction toward a position normal to the plane defined by pivot axes 22 and 70, the greater the downward force acting on the respective frame 21.

It can be seen that as the frame 21, and the furrow openers 27 tend to pivot upwardly about pivots 22, the roller 72 must roll forwardly along the track portion 77. That is, the angle of the lever longitudinal axis moves farther from the perpendicular position with respect to the plane defined by pivots 20 and 22. This will cause the spring 65 to be compressed. With the lever arrangement shown, a small amount of movement of the link 66 compressing the spring 65 results when the furrow openers move up a substantial amount.

Thus, in a normal range of movement, the furrow openers can be forced down with a variable amount of downward force determined by the setting of hydraulic cylinder 42 acting on springs 65, and the depth of the furrow openers will be controlled by the setting of the depth control press wheel 33. The position of the wheel 33 relative to the furrow opener to which it is pivotally connected about pivot 36 may be changed by changing the number of washers 37, or changing the location of the pin which loads the washers on the rod 40.

The lever 69 can be changed in position, and lengthened or shortened if desired for a wider range of operation, but in most normal situations, the range of movement of the roller 72 along the track portion 77 will be adequate to provide a desired range of depth for the furrow openers.

Even under high compressive forces in the spring 65, the lever 69, roller 72 and the track assembly operate to provide a safety release to permit extended upward movement of the furrow openers without excessively loading the spring 65. It can be seen that when the furrow openers pivot upwardly about pivots 22 a sufficient amount, for example with the lower edge of the opener about at ground level, the roller 72 will have moved forwardly, and will pass the junction line between track sections 77 and 78. It can be seen at this stage the roller 72 will move upwardly along the track section 78 without any significant additional compression of the associated spring 65. In fact, the track operates similar to a release. However, the spring 65 will continue to urge the lever rearwardly and thus urge the roller 72 to roll down track section 78 toward track section 77 so that when the obstruction has been cleared by the furrow opener, that furrow opener will be returned to its working position.

The amount of force on all of the springs 65 in a drill assembly can be controlled by changing the length of the spacer 46 on the hydraulic cylinder so that the amount of rotation of control tube 50 is controllable. The depth of each furrow opener is controlled as previously explained by adjusting the stopped position of the press wheel 33. The furrow openers can move through a normal range of movement below the ground surface as the roller 72 rolls along the track section 77. Note that a stop is also provided as indicated at 35A to prevent the press wheel from dropping downwardly when the furrow openers roll over an obstruction as shown in FIG. 2.

The downward force is controlled by a spring operating through a control lever arrangement that provides adequate down pressure on the furrow openers but yet the furrow openers are permitted to lift without overstressing the springs when they encounter an obstruction. The roller track operates with at least two sections, one of which provides increasing spring pressure for normal movement of the furrow openers, and another of which, when ready by the roller of the control lever provides substantially no further increase of spring force during further upward movement of the furrow openers. The spring pressure may actually decrease as the roller moves along the second section. The weight of the subframe 21, and the press wheel and frame 35 will urge the furrow opener toward the ground and will tend to reset the roller onto the first track section.

The mounting for the subframe is shown as a pivotal mounting for ease of manufacture, but the subframe could be guided in any desired manner for upward and downward movement.

The lever 69 comprises a linkage that cooperates with its guides, including the pivot of the lever, the track and track follower roller 72 to load the furrow opener downwardly under force from the spring 65 and also to provide the release function by providing two different rates of loading by the spring on the furrow opener for each increment of upward movement of the furrow opener. That is, in working range each upward inch of movement of the furrow opener loads the spring 65 more than each upward inch of movement of the furrow opener when the opener has moved up to where the roller 72 is on track section 78.

What is claimed is:

1. A furrow opener assembly for a grain drill or the like having a main frame, a subframe movably mounted to said main frame and including a furrow opener member, said mounting of said subframe permitting movement of said furrow opener to a working position with the furrow opener member in the ground and upwardly therefrom, and means to resiliently resist upward movement of said furrow opener member and said subframe comprising a linkage means operably connected between said main frame and said subframe, spring means connected to said linkage means, means guiding said linkage means in a desired path of movement as said subframe moves upwardly, said means guiding include a first working position guide section and a second guide section, said spring means resisting upward movement of the subframe through said linkage means at a first rate when the linkage means is guided in the working position guide section, and at a second substantially lower rate for each increment of upward movement of the subframe when the linkage means is guided in the second guide section after upward movement of said subframe from its working position.

2. The assembly of claim 1 wherein said linkage means includes a lever, means to pivotally mount one end of said lever to one of said frames about an axis, said means guiding comprising means to guide said lever at a location spaced from said pivot of the one end of said lever.

3. The assembly of claim 2 wherein said means guiding comprises a track, a track follower roller on said lever, said lever being mounted about said subframe about a generally horizontal axis and said track being mounted on said main frame above said lever, said lever being loaded in compression as the subframe pivots upwardly and being positioned at an incline to the vertical direction when in working position, said first guide section comprising a generally horizontal track section, and said second guide section being inclined upwardly therefrom, said track follower moving upwardly along said second guide section without substantial pivoting of the lever as the subframe moves upwardly after a preselected amount of upward movement of the subframe from a reference working position.

4. The assembly of claim 2 wherein said means guiding comprises a track, and a track follower on said lever engaging portions of said track.

5. The combination of claim 2 wherein said track follower comprises a roller rotatably mounted on said lever.

6. In a furrow opener assembly for a grain drill or the like, a main frame, a subframe pivotally mounted to said main frame and including a furrow opener member, said pivotal mounting of said subframe permitting movement of said furrow opener member relative to the ground, and means to resiliently resist upward movement of said furrow opener member and said subframe about said pivotal mounting of said subframe comprising a linkage means operably connected between said main frame and said subframe, spring means connected to said linkage means, means guiding said linkage means in a path of movement as said subframe pivots, said means guiding including a first working position guide section and a second guide section, said linkage means loading said spring means at a first rate for each degree of upward pivoting of the subframe with the linkage means guided in the working guide section, and at a second rate which loads the spring means at a substantially lower rate for each degree of pivoting of the subframe with the linkage means guided in the second guide section after substantial upward pivoting of said subframe.

7. The combination as specified in claim 1 and means to vary the pressure exerted by said spring means on said linkage.

8. The combination of claim 1 and means mounted relative to the subframe to engage the ground and prevent said furrow opener assembly from moving toward the ground more than a desired amount.

9. The assembly of claim 8 wherein said means to engage the ground comprises a wheel member positioned to roll along the ground in the path of a furrow formed by the furrow opener assembly, and adjustable means to adjust the position of said wheel member relative to the subframe to provide adjustable depth control for the furrow opener assembly.

10. The assembly of claim 1 wherein said linkage means includes a lever, means to pivotally mount one end of said lever to one of said frames about an axis generally parallel to the axis of pivotal mounting of said subframe and spaced therefrom, said means guiding comprising means to guide said lever at a location spaced from said pivot of the one end of said lever.

11. The combination as specified in claim 10 wherein said spring means comprises a spring loaded member pivotally mounted to said lever between the end of said lever pivotally mounted to said one frame and said means guiding.

12. The combination of claim 10 wherein said means guiding comprises a track, a track follower connected to said lever and moving in said track as the subframe pivots upwardly.

13. The combination of claim 12 wherein said track follower comprises a roller rotatably mounted on said lever.

14. The assembly of claim 10 wherein said means guiding comprises a track, a track follower roller on said lever, said lever being mounted above said subframe and said track being mounted on said main frame above said lever, said lever being loaded in compression as the subframe pivots upwardly, said first guide section comprising a generally horizontal track section, and said second guide section being inclined upwardly to permit the lever to move upwardly without substantial pivoting of the lever as the subframe continues to pivot upwardly.

15. The assembly of claim 14 wherein said spring means is a compression spring resisting pivoting of said lever as the subframe pivots upwardly.

* * * * *

UNITED STATES PATENT OFFICE
CERTIFICATE OF CORRECTION

PATENT NO. : 4,077,478

DATED : March 7, 1978

INVENTOR(S) : Chester G. Neukom

It is certified that error appears in the above-identified patent and that said Letters Patent are hereby corrected as shown below:

In the abstract, line 4, before relatively insert --a--. Column 6, line 26 "ready" should be --reached--. Column 7, line 30, (Claim 5, line 1) "Claim 2" should be --Claim 4--.

Signed and Sealed this

Fifteenth Day of August 1978

[SEAL]

Attest:

RUTH C. MASON
Attesting Officer

DONALD W. BANNER
Commissioner of Patents and Trademarks